(12) United States Patent
Sekine

(10) Patent No.: US 6,417,940 B1
(45) Date of Patent: Jul. 9, 2002

(54) PHASE TYPE COMPUTER HOLOGRAM AND OPTICAL INSTRUMENT

(75) Inventor: Yoshiyuki Sekine, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/434,296

(22) Filed: Nov. 5, 1999

(30) Foreign Application Priority Data

Nov. 6, 1998 (JP) .......................................... 10-332003
Nov. 2, 1999 (JP) .......................................... 11-312481

(51) Int. Cl.$^7$ ................................................ G03H 1/08
(52) U.S. Cl. ........................... 359/9; 359/566; 359/575
(58) Field of Search .................... 359/9, 11, 1, 566, 359/569, 575

(56) References Cited

U.S. PATENT DOCUMENTS

| | | | |
|---|---|---|---|
| 3,623,786 A | 11/1971 | Dammann | 350/3.5 |
| 3,891,300 A | 6/1975 | Tsunoda | 350/3.5 |
| 4,037,918 A | 7/1977 | Kato | 350/3.5 |
| 4,143,937 A | 3/1979 | Yonezawa et al. | 350/3.82 |
| 5,587,815 A | * 12/1996 | Sato | 359/11 |

OTHER PUBLICATIONS

N.Vainos, S.Mailis, S.Pissadakis, L.Boutsikaris, P.Parmiter, P.Dainty, T.Hall, "Excimer laser use for microetching computer generated holographic structures", Applied Optics, 35(32), pp. 6304–6319, Nov. 1996.*

* cited by examiner

Primary Examiner—Cassandra Spyrou
Assistant Examiner—Leo Boutsikaris
(74) Attorney, Agent, or Firm—Fitzpatrick, Cella, Harper & Scinto

(57) ABSTRACT

A phase type computer hologram has a plurality of cells for applying a predetermined phase to different portions of a wavefront of light, wherein no phase skip larger than π is present in the cells. Such a phase type computer hologram can be produced by a process of determining phases for a plurality of cells, respectively, smoothening a distribution of the phases of the cells, by shifting the phase of at least one of the cells by 2π, and forming, on a substrate, the cells whose phase distribution is smoothened in the smoothening step.

9 Claims, 3 Drawing Sheets

PHASE TYPE COMPUTER HOLOGRAM AND OPTICAL INSTRUMENT

FIELD OF THE INVENTION AND RELATED ART

This invention relates to a phase type computer hologram and an optical instrument suitably usable in an optical system such as an optical interconnection system, a lens surface shape measuring system or an illumination optical system, for example.

A process for producing a hologram by use of a computer is called "computer hologram". In an earlier stage, it is directed to reproduction of a virtual three-dimensional object. Currently, however, because of its ability of deforming a wavefront of light as desired, it is applied to various optical systems such as an optical interconnection system, a lens surface shape measuring system and an illumination system, for example.

In the computer hologram, amplitudes or phases of incident light rays at different positions on a hologram are changed so that a desired deformation is produced in the wavefront of the incident light, and a desired image is produced through propagation of the deformed wavefront. As an example of a method of causing wavefront deformation, there is a coding method called a "binary hologram" wherein a complex amplitude of a deformed wavefront such as described above is approximated on the basis of a transmission factor distribution of binary levels of black and white. Because a complex amplitude distribution can be reproduced and the process is relatively simple, this method is used widely at present. However, because it is an amplitude type hologram, it involves inconveniences such as a low diffraction efficiency and production of a ghost image due to higher-order diffraction light.

On the other hand, there is a kind of phase type hologram, called a "Kinoform" wherein the phase of incident light is changed. It is known that, if an idealistic Kinoform is produced, the diffraction efficiency thereof becomes equal to 100%. Such Kinoform may be used as a phase type computer hologram.

A phase type computer hologram can be produced by a method wherein an original with a pattern having a multiple-value density distribution, determined by calculation, is produced by use of an intermediate-tone plotter, and wherein the pattern of the original is transferred onto a dry plate in reduced magnification, the dray plate being thereafter bleached to produce a phase type hologram. Recently, however, a method in which a shape is directly produced upon a substrate surface by cutting, and a method in which a binary optics is produced while approximating a Kinoform-like shape with a step-like shape by use of a photolithographic process, are used widely. Particularly, because a very fine structure can be produced at a good precision, the latter method is used in many cases for production of surface relief type diffraction optical elements, in general, not only for production of hologram.

In phase type diffraction optical elements such as a Kinoform described above, the phase of light impinging on the element is changed by an amount determined by a phase function applied. While such phase function can be expressed by a function $\phi(x, y)$ of the position $(x, y)$ upon the element, since the phase term of light has a period of $2\pi$, a change of $\phi(x, y)$ (mod$2\pi$) will be sufficient in practice. Such a phase change may be applied by forming an appropriate curved surface upon a substrate to produce a suitable optical path difference. However, if $\phi(x, y)$ is a continuous function, then $\phi(x, y)$ (mod$2\pi$) will change continuously within a certain zone, while, at a position as folded by "mod", it takes discontinuous points having a difference $2\pi$.

Considering this in terms of the surface of a substrate, while the shape changes smoothly within a certain zone, there is produced, at the discontinuous points, a surface step (level difference) of optical path length $\lambda$ corresponding to the phase $2\pi$. As regards the shape which is continuous only in a certain zone, it becomes very difficult to form such shape if the width of the zone is small. In consideration of it, there is a method in which the shape in that zone is approximated by a step-like shape.

The concept described above basically applies to a phase type computer hologram. However, usually, no curved surface is formed on a substrate in accordance with a phase function-applied. Rather, in many cases, from the size and resolution of an image desired, the size of cells as a whole as well as the size of each cell necessary for a phase type computer hologram are calculated and, on the basis of which, phase values for the cells are optimized. Here, "cells" refer to small areas as divided by what is called a "mesh".

Here, the phases of the cells may be set continuously, in a range from $0-2\pi$. In order to provide these phase values on the basis of the surface shape, the depth direction has to be controlled continuously. If this is done through an etching process, the control has to be made separately with respect to individual cells and, therefore, the process for continuous depth control is difficult to accomplish. In consideration of it, the phase values of the cells may be set to $2\pi j/N$ (where N is a natural number and $0 \leq j < N-1$) and a solution for phase distribution may be obtained. On the basis of it, an etching process may be repeated N times, at the maximum, by which a phase type computer hologram may be produced.

However, as regards a binary optics element such as shown in FIG. 7, for example, having a sectional shape corresponding to a phase type computer hologram where N=4, particularly when an element equivalent to a lens is considered, although the phase function usually changes monotonously, there is no such monotonous change present in the case of a phase type computer hologram which requires complicated wavefront deformation as compared with the lens. Therefore, when considered one-dimensionally, there may be a case wherein the phase value of successive three cells once skips by more than $\pi$, at the position of a cell 3 and then turns back. In terms of surface shape, this corresponds to a protrusion or a recess having a height (depth) of $\lambda/2$ or more. Particularly where the size of the cells is small, it is very difficult to produce such shape with a good precision,

SUMMARY OF THE INVENTION

It is accordingly an object of the present invention to provide a phase type computer hologram having a good shape precision.

In accordance with an aspect of the present invention, there is provided a phase type computer hologram, characterized by a plurality of cells for applying a predetermined phase to different portions of a wavefront of light, wherein no phase skip larger than it is present in the cells.

In accordance with another aspect of the present invention, there is provided a method of producing a phase type computer hologram, comprising the steps of: determining phases for a plurality of cells, respectively; smoothening a distribution of the phases of the cells, by shifting the phase of at least one of the cells by $2\pi$; and forming, on a substrate, the cells whose phase distribution is smoothened in said smoothening step.

The smoothening step may include shifting the phase of at least one cell by $2\pi$ so that a least square error related to the cell phase is reduced.

The smoothening step may further include (i) a process for separating the cells into plural groups and detecting, with respect to each groups, a least square error related to the cell phase, and (ii) a process for shifting, by $2\pi$, the phase of said at least one cell in a cell group or groups where the detected least square error is larger than a threshold value, to thereby reduce the least square error related to the cell phase.

The phase type computer hologram may be a hologram having a phase distribution.

The phase type computer hologram may be a hologram having a phase distribution and an amplitude distribution.

In accordance with a further aspect of the present invention, there is provided a system including a hologram produced in accordance with a method as described above.

In accordance with a yet further aspect of the present invention, there is provided an exposure apparatus having an illumination system including a hologram produced in accordance with a method as described above.

In accordance with a still further aspect of the present invention, there is provided a device manufacturing method, comprising the steps of: illuminating a device pattern by use of an illumination system including a hologram produced in accordance with a method as recited above, so that a substrate is exposed with the device pattern; and developing the exposed substrate.

A phase type computer hologram according to the present invention may be a hologram of a type having a phase structure only, or it may be a hologram of a type having both a phase structure and an amplitude structure. Some preferred embodiments of the present invention to be described below, show holograms of both of these types, wherein a phase skip of cells is kept not greater than $\pi$.

In a phase type computer hologram according to one preferred form of the present invention, at least one of cells has a level difference (step) having been changed by an amount corresponding to a multiple, by an integer, of a wavelength (design wavelength) of light to be used, in respect to the optical path length defined by the step In a phase type computer hologram according to another preferred form of the present invention, one or more cells in a certain region have a level. difference (step) having been changed by an amount corresponding to a multiple, by an integer, of a wavelength (design wavelength) of light to be used, in respect to the optical path length defined by the step, so that an average square error of the steps of the cells in that region or of the cells of the whole is reduced.

In a phase type computer hologram according to a further preferred form of the present invention, at least one of cells of the hologram has a height having been changed by an amount corresponding to a multiple, by an integer, of a wavelength (design wavelength) of light to be used, in respect to the optical path length defined by passage through that cell, such that a level difference (step) with an adjacent cell is reduced.

In a phase type computer hologram according to a yet further preferred form of the present invention, at least one of cells in a certain region has a height having been set so that the optical path length changes by an amount corresponding to a multiple, by an integer, of a wavelength (design wavelength) of light to be used, so that an average square error of the steps of the cells in that region or of the cells of the whole is minimized.

In a phase type hologram producing method according to one preferred form of the present invention, evaluation is made to phase skip among cells at least in a certain region of the hologram and, if there is a phase skip larger than a predetermined value, the phase value of a cell or cells in that region is increased or decreased by $2\pi$, by which the phase skip in that region is minimized.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to FIGS. 1–6 of the accompanying drawings.

Figure 1:
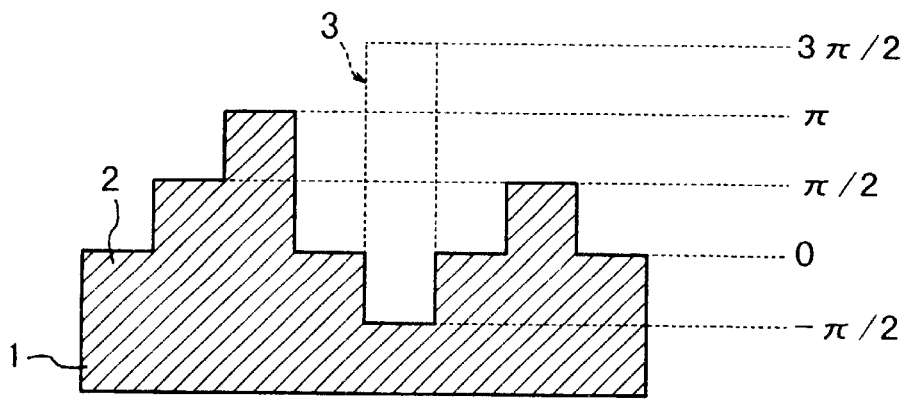
FIG. 1 is a schematic and sectional view of a hologram shape according to a first embodiment of the present invention.
Figure 7:
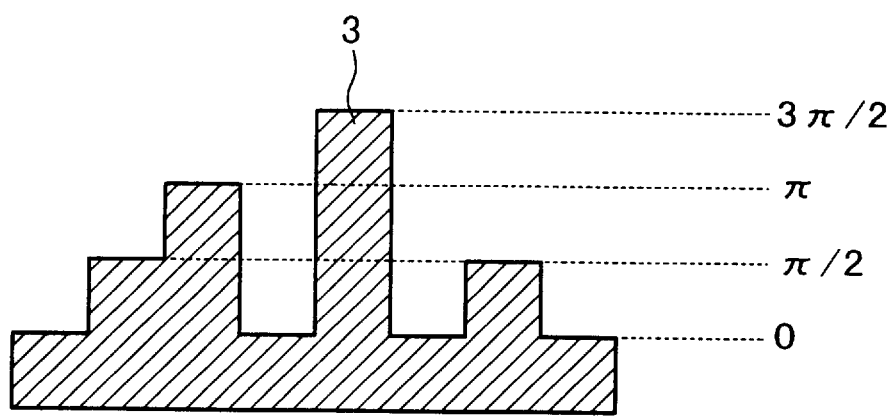
FIG. 7 is a schematic and sectional view of a hologram shape which involves inconveniences to be solved by the present invention.

FIG. 1 is a schematic and sectional view of a surface shape of a computer hologram according to a first embodiment of the present invention. In this example, the phase sampling number N is N=4, and a computer hologram 2 is formed on a bottom substrate 1. If, for example, the surface shape of the computer hologram 2 is such as shown in FIG. 7, it means that there is a skip of $3\pi/2$, larger than $\pi$, between the phases at adjoining portions. If the level difference (step) become so large, it becomes very difficult to produce the hologram shape at a good precision.

This problem can be solved while relying on that the phase term of light has a period $2\pi$, more specifically, by surveying the whole hologram and by adjusting the phase of a cell or cells where there is a skip larger than $\pi$. For example, in a case where there is a cell 3 having a raised skip of a phase value $3\pi/2$, a phase value $-\pi/2$ obtainable from subtracting $2\pi$ from the original phase $3\pi/2$ of the cell 3 may be applied to the mesh as a new phase value. While the number of etching operations required may increase, the level difference with an adjacent cell can be reduced to $\pi$ or less, such that the surface shape can be produced with a good precision.

By applying a phase $-\pi/2$ to the cell 3, having a skip, on the basis of the periodicity $2\pi$ of the phase term, in the surface shape of the computer hologram 2 as produced, there is no skip larger than π such as depicted by a solid line in FIG. 1. Even with use of such surface shape, the performance of the computer hologram 2 does not substantially change, and a shape which changes generally smoothly can be produced.

Figure 2:
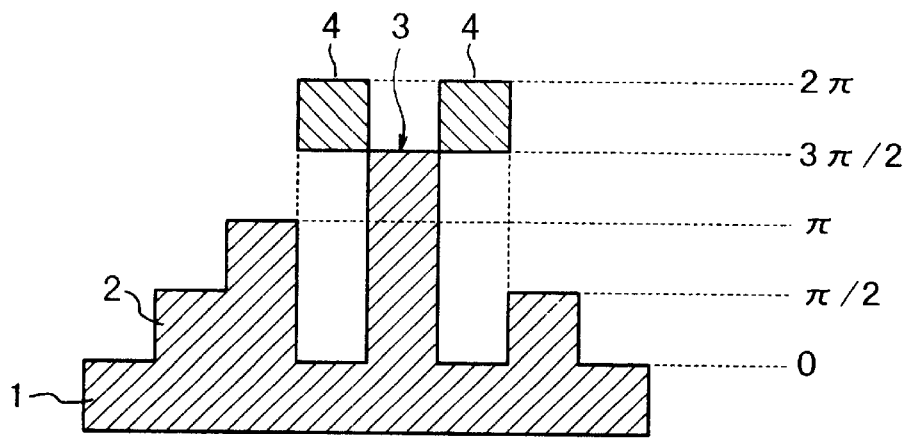
FIG. 2 is a schematic and sectional view of a hologram shape according to a second embodiment of the present invention.

FIG. 2 is a schematic and sectional view of a surface shape of a computer hologram according to a second embodiment of the present invention. In the embodiment of FIG. 1, a value 2π is subtracted from the phase of a cell with a phase skip. In the present embodiment, as compared therewith, an increment 4 of an amount 2π is added to the phase of each of two portions which are juxtaposed with a portion 3 with a skip. A similar advantageous result is attainable, also in this example.

Figure 3:
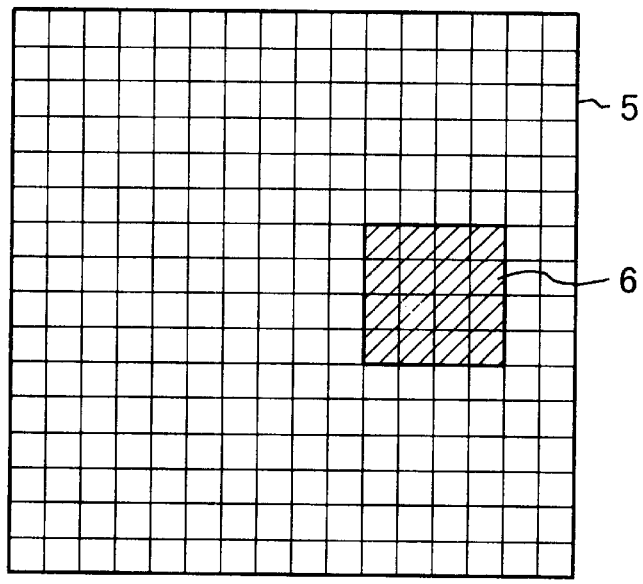
FIG. 3 is a schematic and plan view of a phase type computer hologram according to a third embodiment of the present invention.

FIG. 3 is a schematic and plan view of a hologram, for explaining a third embodiment of the present invention. In this case, within the whole computer hologram 5, those cells in a certain region 6 having sixteen cells (sampling number is 4×4) are selected as a numerical example. With regard to all the cells in the region 6, a root mean square error of the phase values is calculated while adding a phase of ±2π to each cell, and then the phase values are adjusted so as to minimize the root mean square error. Here, the root mean square error (rms) can be defined by the following equation:

$$\text{rms} = [\Sigma\{(\text{PHASE}_{CELL}) - (\text{PHASE}_{AVE})\}^2 / (\text{N.O.C.})]^{1/2}$$

where $\text{PHASE}_{CELL}$ refers to phase value of each cell, $\text{PHASE}_{AVE}$ refers to an average of phases of all the cells, and N.O.C. is the number of all the cells.

The numerical values of the cells in the region 6 correspond to "j" in the phase "j×(π/2)" to be applied to each cell, and the data is as follows:

2 3 0 0
1 0 2 3
3 2 0 0
2 2 0 0

The data "j" above has an average 1.25, and the root mean square error is 1.20. The portion within this range where there is a skip beyond π is placed at the phase combination of 0 and 3. Thus, the phase 0 may be replaced by 4 (4*π/2=2π). Also, there is a phase combination of 4 and 0 present, and in that portion the phase may be replaced by 4. Therefore, in this example, all the portions of phase 0 may be replaced by 4. Thus, numerical values of the cells in the region 6 after through adjustment according to the present invention, which values correspond to "j" of the phase "j×(π/2)", will be those as follows:

2 3 4 4
1 4 2 3
3 2 4 4
2 2 4 4

The root mean square error in this case is 1.00 smaller than 1.20 which is a value before the present invention is applied. In this example, although there is a phase skip larger than π at the second row and between first and second columns, the phase change is generally very smooth as compared with the preceding data.

Figure 4:
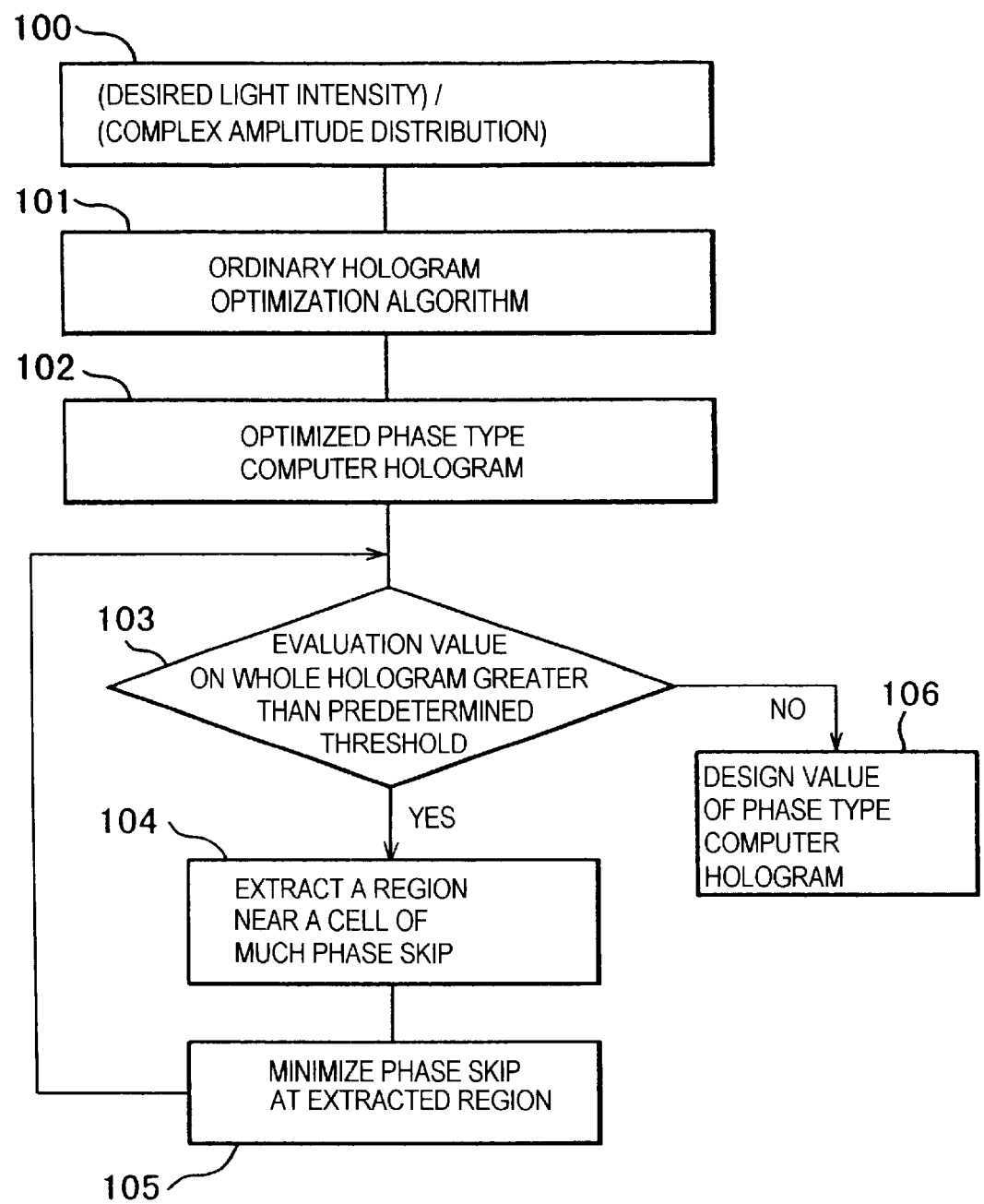
FIG. 4 is a flow chart for explaining a designing process for a phase type computer hologram according to an embodiment of the present invention.

FIG. 4 is a flow chart for explaining a designing process for a phase type computer hologram according to an embodiment of the present invention.

First, there is a certain light intensity distribution or a complex amplitude distribution 100 to be accomplished, and, in order to achieve the same with a hologram, the hologram design is made by use of an optimization algorithm (101). Any optimization algorithm may be chosen as desired. There are a Fourier repetition method, a simulated annealing method and a genetic algorithm, well known in the art. The hologram design value 102 (i.e., phase values of cells) thus determined has been set without a concern to a phase skip as described hereinbefore, and therefore a problem will take place in relation to the production. Although there may be a method in which the phase skip may be reduced as an optimization parameter in the optimization, here, an example in which convergence of optimization in the hologram designing is not very deteriorated will be explained.

The phase skip may be evaluated first (103), over the whole hologram. As an evaluation method, there is a method in which "rms" of phase is taken, as described hereinbefore. Alternatively, those cells having a phase skip, with respect to the phase of cells adjacent thereto, which is larger than π may be counted and the number of such cells among all the cells may be determined. When the number is counted, weighting may be done in the manner that, if the cell has a rectangular shape, a weight 1 may be assigned to those cells juxtaposed laterally and longitudinally to that cell while a weight 1/√2 may be assigned to those cells juxtaposed diagonally to that cell. As an alternative, a weight 0 may be assigned to those cells juxtaposed diagonally to that cell.

In cases where the evaluated value having been determined in accordance with any evaluation method is not greater than a predetermined threshold value, the design value may be adopted (106). If it is greater than the predetermined threshold value, a region where there are many phase skips involved may be extracted (104).

For this extraction, the whole hologram may be divided into intermediate regions each including cells corresponding to 1/16 of the whole hologram, for example, such as shown in FIG. 3, and evaluation the same as has been made to the hologram as a whole may be made to each of these intermediate regions. Then, a region having a largest evaluated value may be selected. Here, the hologram may be divided in any manner, as desired.

Then, with regard to the thus extracted region, while a freedom ±2π is applied to the phase values of all the cells in that region, the evaluation value may be minimized (105). Here, although a restriction condition may not necessarily be applied to the phase value, generally, a certain condition will be applied. For example, if the phase value just after the optimization is accomplished is within a range 0–2π, a freedom of +2π may be applied to those cells having a phase value not greater than π/4, while a freedom of −2π may be applied to those cells having a phase value not less than 3π/4. The remaining cells may be held unchanged.

After completion of minimization to the phase skip in regard to the extracted region, further evaluation of phase skip may be made to the whole hologram. If the result is not greater than a predetermined value, it may be adopted as a hologram design value. If it is greater than the predetermined value, the region extraction may be repeated.

By designing a phase type computer hologram in the manner described above, a desired light intensity distribution and/or complex amplitude distribution can be produced. Also, a hologram design value with which the difficulty in production can be reduced, is attainable.

Figure 5:
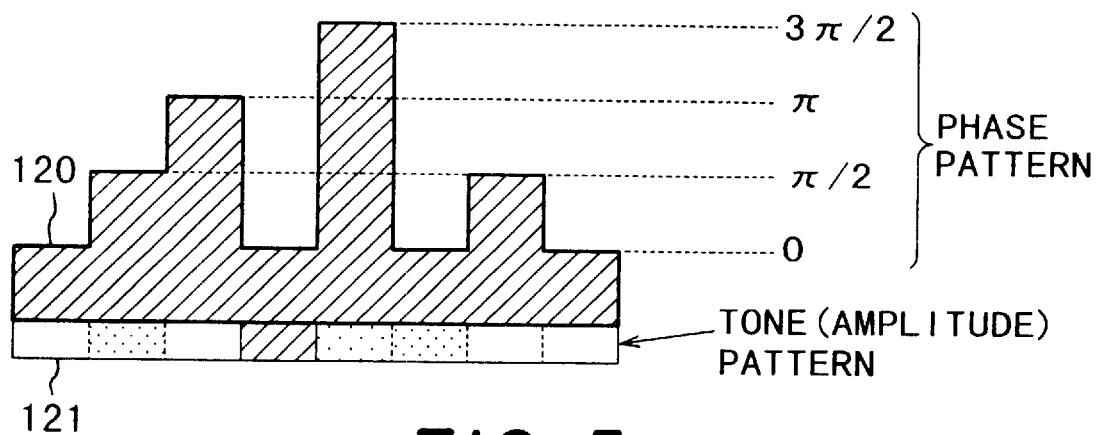
FIG. 5 is a schematic and sectional view of a complex amplitude type computer hologram which is a modified example of a phase type computer hologram according to the present invention.

It is to be note that phase type computer holograms according to the present invention may include a complex amplitude type such as shown in FIG. 5 wherein, in each cell, a phase (at 120) as well as an amplitude (at 121) are both controlled.

Figure 6:
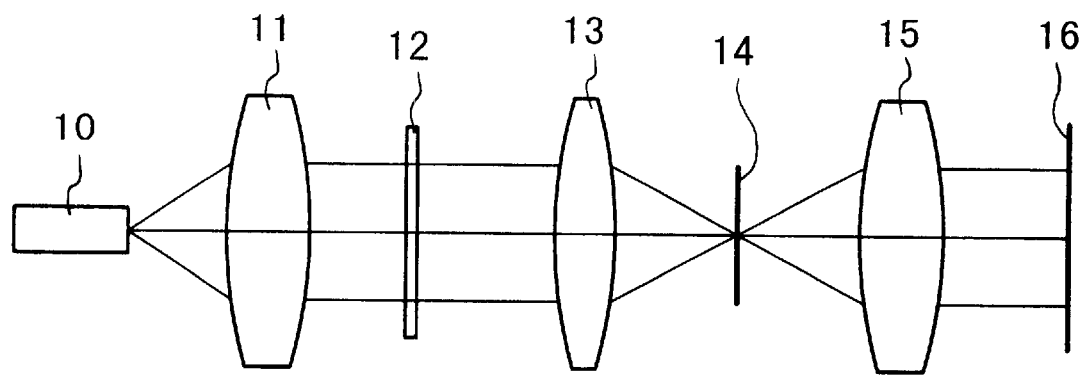
FIG. 6 is a schematic view of an optical device according to an embodiment of the present invention.

FIG. 6 is a schematic view of an optical device according to an embodiment of the present invention, wherein there are a light source 10, an optical system 11, a computer hologram 12 produced in accordance with the present invention, another optical system 13, a dummy plane 14, a further optical system 15, and an imaging plane 16 which are disposed or defined along an optical axis, in this order. Here, a Fourier transform hologram in which the computer hologram 12 is disposed at a front focal point position of the optical system while the dummy plane 14 is placed at a rear focal point position, is considered.

The light from the light source 10 illuminates the computer hologram 12 through the optical system 11. The light whose wavefront is deformed by the computer hologram 12 passes through the optical system 13 and the dummy plane 14, and, after being shaped by the optical system 15, it produces a desired complex amplitude distribution upon the imaging plane 16. Since various light intensity distributions can be produced upon the imaging plane 16, the optical device such as described above has a wide applicability. By use of a hologram produced at a good precision as the computer hologram 12, a high precision optical device or optical instrument which may be used for an illumination optical system, a lens surface shape measuring device or an optical Interconnection, for example, can be provided.

Where it is used as an illumination optical system for a projection exposure apparatus, the computer hologram 12 may have been designed with respect to a wavelength of laser light from an ArF excimer laser or a $F_2$ excimer laser, for example. With use of such hologram, light such as ring-like light, for example, can be projected on an optical integrator such as a fly's eye lens, for example, having its light entrance face disposed on the image plane 16.

While the invention has been described with reference to the structures disclosed herein, it is not confined to the details set forth and this application is intended to cover such modifications or changes as may come within the purposes of the improvements or the scope of the following claims.

What is claimed is:

1. A phase type computer hologram having a phase sampling number not less than 3, comprising:

a plurality of cells for applying a predetermined phase to different portions of wavefront of light, wherein said cells involve no phase skip greater than $\pi$.

2. A method of producing a phase type computer hologram, comprising:

a determining step of determining phases for a plurality of cells of said hologram so that the cells apply a predetermined phase to different portions of a wavefront of light; and a reducing step of shifting, by $2\pi$, the phase of a particular cell of the cells whose phases have been determined by said determining step, where there is a phase skip greater than $\pi$ between the particular cell and a cell adjacent the particular cell, thereby to reduce the phase skip to be not greater than $\pi$.

3. A method according to claim 2, wherein said reducing step includes shifting the phase of at least one cell by $2\pi$ so that a root mean square error related to the cell phase is reduced.

4. A method according to claim 3, wherein said reducing step further includes (i) a process for separating the cells into plural groups and detecting, with respect to each group, a root mean square error related to the cell phase, and (ii) a process for shifting, by $2\pi$, the phase of said at least one cell in a cell group or groups where the detected root mean square error is larger than a threshold value, to thereby reduce the root mean square error related to the cell phase.

5. A method according to any one of claims 2–4, wherein the phase type computer hologram is a hologram having a phase distribution.

6. A method according to any one of claims 2–4, wherein the phase type computer hologram is a hologram having a phase distribution and an amplitude distribution.

7. A system including a hologram produced in accordance with a method as recited in any one of claims 2–4.

8. An exposure apparatus having an illumination system including a hologram produced in accordance with a method as recited in any one of. claims 2–4.

9. A device manufacturing method, comprising the steps of:

illuminating a device pattern by use of an illumination system including a hologram produced in accordance with a method as recited in any one of claims 2–4, so that a substrate is exposed with the device pattern; and developing the exposed substrate.

* * * * *

UNITED STATES PATENT AND TRADEMARK OFFICE
CERTIFICATE OF CORRECTION

PATENT NO. : 6,417,940 B1
DATED : July 9, 2002
INVENTOR(S) : Yoshiyuki Sekine

It is certified that error appears in the above-identified patent and that said Letters Patent is hereby corrected as shown below:

Column 1,
Line 46, "dray" should read -- dry --.

Column 2,
Line 15, "function-applied." should read -- function applied. --.
Line 59, "it" should read -- $\pi$ --.

Column 3,
Line 6, "groups," should read -- group, --.
Lines 41, 48 and 55, "in" should read -- with --.
Line 42, "step" should read -- step. --.
Line 45, "level." should read -- level --.

Column 4,
Line 41, "to" (close up right margin).
Line 42, "FIGS." (close up left margin).
Line 51, "become" should read -- becomes --.

Column 5,
Line 48, "through" should be deleted.

Column 6,
Line 63, "note" should read -- noted --.

Column 7,
Line 25, "Interconnection" should read -- interconnection --.
Line 43, "wavefront" should read -- a wavefront --.

UNITED STATES PATENT AND TRADEMARK OFFICE
CERTIFICATE OF CORRECTION

PATENT NO.    : 6,417,940 B1
DATED         : July 9, 2002
INVENTOR(S)   : Yoshiyuki Sekine It is certified that error appears in the above-identified patent and that said Letters Patent is hereby corrected as shown below:

Column 8,
Line 35, "of." should read -- of --.

Signed and Sealed this

Twenty-seventh Day of May, 2003

JAMES E. ROGAN
*Director of the United States Patent and Trademark Office*